Patented Jan. 30, 1945

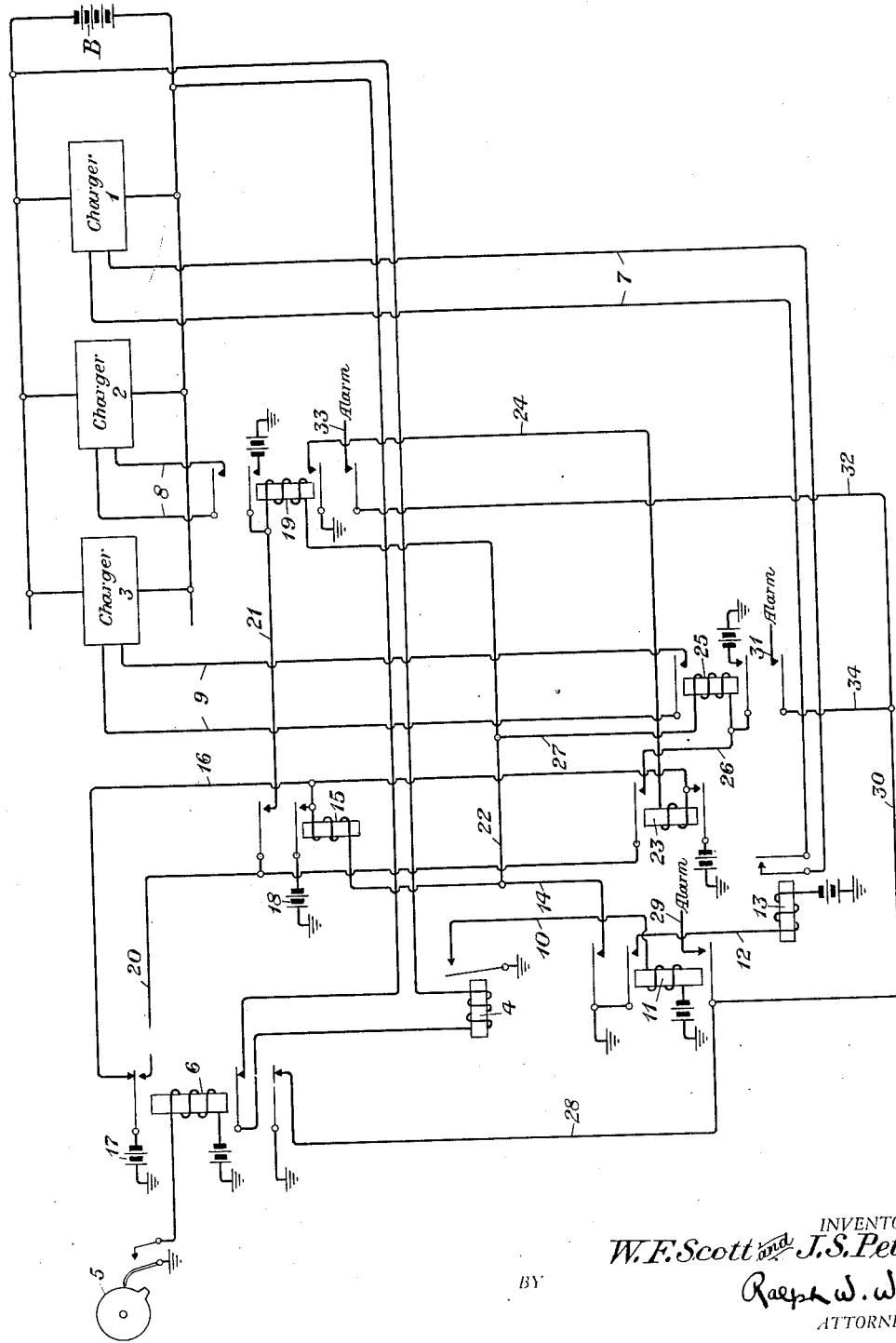

2,368,264

UNITED STATES PATENT OFFICE 2,368,264

BATTERY CHARGING SYSTEM

Walter Franklyn Scott, Milburn, and James Stewart Peters, West Orange, N. J., assignors to American Telephone and Telegraph Company, a corporation of New York Application July 7, 1943, Serial No. 493,710

9 Claims. (Cl. 320—21)

This invention relates to arrangements for charging batteries and more particularly to arrangements for charging such batteries at a multiplicity of rates.

One of the objects of the invention is to provide arrangements for connecting a charging unit to a battery at predetermined intervals of time and to provide arrangements which will operate if the battery becomes substantially charged before the end of said time interval to disconnect the charging unit from the battery. A further object of the invention is to provide additional charging units and to provide arrangements which will operate if the battery is not substantially charged at the end of said time interval to connect another one of such charging units to the battery in addition to the first unit. The arrangements of the invention will continue at the end of each successive time interval to connect additional charging units to the battery if at the end of each such interval the battery is not substantially charged. When the battery is finally substantially charged the arrangements will disconnect all the charging units from the battery and at the end of the ensuing time interval a single charging unit will again be connected to the battery. Alarm arrangements are also provided to indicate whether or not the apparatus is functioning properly. Other features and objects of the invention will appear more fully from the detailed description thereof hereinafter given.

The invention may be more fully understood from the following description together with the accompanying drawing in the figure of which is shown a circuit diagram embodying a preferred form of the invention.

In the drawing is shown a battery B to be charged. Associated with the battery B are shown the chargers 1, 2 and 3. Additional chargers could be provided, if desired. Connected across battery B is a relay 4 which will be operated by the battery B when it becomes substantially charged but will not be operated thereby when the battery is not substantially charged. The relay 4, however, is so adjusted that when it is operated it will be held operated by the battery B even though the battery B is not substantially charged. In the apparatus there is provided clock-driven mechanism (not shown) which will rotate the cam 5 once during a definite time interval as, for purposes of illustration, one hour. The cam mechanism 5 accordingly will close a circuit for a relay 6 once an hour and cause it to operate for a brief interval as, for example, about half a minute. This will open the circuit for the relay 4 if it has been operated by the battery B becoming substantially charged and will cause relay 4 to release. The release of relay 4 will set mechanism in operation to close a circuit 7 and render charger 1 operative. Charger 1 will accordingly commence to charge the battery B. If during the first interval of time, such as the first hour, the battery B becomes substantially charged, relay 4 will operate and disable the mechanism for completing the circuit 7 and will disable the charger 1. However, if the battery B does not become substantially charged during the first time interval, relay 4 remains released and charger 1 remains operated throughout the interval. When the cam again closes the circuit for relay 6 and operates it momentarily, additional mechanism, which was prepared for operation when relay 4 first released, will function to close a circuit 8 for the charger 2 and render it operative. Chargers 1 and 2 will now charge battery B. If during the second hourly interval the battery B becomes substantially charged, the relay 4 will operate and restore all the apparatus to normal and disable chargers 1 and 2. However, if during the second hourly interval the battery B does not become substantially charged, the relay 4 will still remain released. When the cam 5 again closes the circuit relay 6 is momentarily operated. This will cause additional apparatus to function to close a circuit 9 to render the charger 3 operative to also charge the battery B. This sequence of events will continue to add other chargers to the battery B until it becomes substantially charged. At this point it will operate the relay 4 which will return the mechanism to normal and disable all of the chargers. At the end of the ensuing interval of time the cam 5 will again momentarily operate relay 6 and release relay 4 to start a similar sequence of events.

The invention may be more fully understood from the following detailed description of its operation. Let it be assumed that during a previous time interval the battery B has become substantially charged and operated relay 4, which has caused all of the chargers such as 1, 2 and 3 to be disabled. At the end of the time interval the cam 5 will close the circuit for relay 6 and operate it for a short interval such as half a minute. The operation of relay 6 will open a circuit for relay 4 and allow it to release. The release of relay 4 will close the following circuit: from ground, armature and contact of relay 4, conductor 10, relay 11 to battery and ground. This will operate relay 11. As pointed out heretofore relay 4 will remain released until the battery B becomes substantially charged. The operation of relay 11 will close the following circuit: ground, armature and contact of relay 11, conductor 12, winding of relay 13 to battery and ground. The operation of relay 13 will close the circuit 7 which will render the charger 1 operative. The charger 1 accordingly will commence to charge the battery B. The operation of relay 11 also closes the following circuit as soon as relay 6 releases after its momentary operation: from ground, armature and contact of relay 11, conductor 14, winding of relay 15, conductor 16, armature and contact of relay 6 through battery 17 and ground. This will operate relay 15 which will lock up from battery 18, armature and contact of relay 15, winding of relay 15, conductor 14, armature and contact of relay 11 to ground. It is pointed out that relay 15 locks up under control of relay 11 and accordingly will be released when relay 11 is in turn released by the operation of relay 4. The operation of relay 15 prepares an operating circuit for the relay 19 which controls the circuit 8 of the charger 2. Relay 19, however, does not operate at this time because the relay 6 is released. If, during the first time interval the relay B becomes substantially charged, the relay 4 will operate and remain operated. This would release relays 11, 13 and 15 and would open the circuit 7 and disable the charger 1. At the end of the first time interval relay 6 would again operate momentarily and again release relay 4. This would cause the foregoing sequence of events to be repeated and the charger 1 rendered operative and the circuit prepared for rendering the charger 2 operative. However, let it be assumed that during the first time interval the battery B did not become substantially charged and relay 4 was not operated but remained released. Accordingly, at the end of the first time interval the cam 5 will again cause the relay 6 to operate momentarily. As the relay 4 was released, the operation of relay 6 will have no effect thereon. However, the operation of relay 6 will close the following circuit: from battery 17, armature and contact of relay 6, conductor 20, upper armature and contact of relay 15, conductor 21, winding of relay 19, conductor 22, conductor 14, contact and armature of relay 11 to ground. This will operate relay 19. The operation of relay 19 will close the circuit 8 and render the charger 2 operative. Both chargers 1 and 2 will now be charging the battery B. The relay 19 locks up over a circuit from ground and battery, contact and armature of relay 19, winding of relay 19, conductors 22 and 14, contact and armature of relay 11 to ground. After an interval relay 6 will again release. This will complete the following circuit: battery 17, armature and contact of relay 6, conductor 16, winding of relay 23, conductor 24, contact and armature of relay 19 to ground. This will operate relay 23, which will lock up over a circuit from battery, armature and contact of relay 23, winding of relay 23, conductor 24, contact and armature of relay 19 to ground. The operation of relay 23 serves to prepare an operating circuit for relay 25 which controls circuit 9, which in turn controls charger 3. Relay 25, however, does not operate at this time because relay 6 is released. Again it is pointed out that if, during the second time interval, the battery B becomes substantially charged, relay 4 will operate and restore the apparatus to normal. However, let it be assumed that during the second time interval the battery B has not become substantially charged and relay 4 remains released. At the end of the second time interval the cam 5 will again cause relay 6 to operate momentarily. This will have no effect on relay 4 as it has already released. However, the operation of relay 6 will close the following circuit: battery 17, contact and armature of relay 6, conductor 20, armature and contact of relay 23, conductor 26, winding of relay 25, conductor 27, conductors 22 and 14, contact and armature of relay 11 to ground. This will operate relay 25, which will close circuit 9 and render the charger 3 operative. Chargers 1, 2 and 3 will now be charging battery B. A locking circuit is provided for relay 25 from battery, contact and armature of relay 25, winding of relay 25, conductors 27, 22 and 14, contact and armature of relay 11 to ground. It is pointed out that relay 25 and also relay 19 are locked up under control of relay 11 and accordingly will be released when relay 11 is in turn released by the operation of relay 4.

While only three chargers have been shown associated with the battery B, it is obvious that by adding additional groups of relays, such as 15—19 and 23—25, additional chargers could be added to those already charging the battery B.

The invention also provides an alarm circuit individual to each charger to indicate whenever a charger which has been turned on fails. For example, when relay 6 first releases the following circuit is closed: from ground, lower armature and contact of relay 6, conductor 28, lower armature and contact of relay 11, to the alarm circuit 29. The charger 1 will have in its output circuit relay arrangements (not shown) which, when the charger is turned on and is functioning, will hold open a circuit to an alarm. This circuit will be completed to ground over the circuit 29 and the circuit just traced if the charger fails. When relay 6 next releases this circuit is extended from conductor 28, over conductor 30, conductor 32, lower armature and contact of relay 19, to alarm circuit 33. When relay 6 next releases, the circuit is extended from conductor 30, over conductor 34, lower armature and contact of relay 25, to alarm circuit 31. Alarm circuits 31 and 33 are similar to alarm circuit 29.

While the arrangements of the invention have been disclosed as embodied in certain specific arrangements, it is understood that they are capable of embodiment in many and other widely varied forms without departing from the spirit of the invention as defined by the appended claims.

What is claimed is:

1. A battery charging system comprising a battery to be charged, a plurality of chargers associated with said battery, apparatus operating at regular time intervals, means operated by one operation of said apparatus for operatively connecting a first one of said chargers to said battery, and means operated by the next succeeding operation of said apparatus for operatively connecting a second one of said chargers to said battery.

2. A battery charging system comprising a battery to be charged, a plurality of chargers associated with said battery, apparatus operating at regular time intervals, means operated by one operation of said apparatus for operatively connecting a first one of said chargers to said battery, and means operated by successive operations of said apparatus for operatively connecting additional ones of said chargers to said battery successively.

3. A battery charging system comprising a battery to be charged, a plurality of chargers associated with said battery, apparatus operating at regular time intervals, means operated by one operation of said apparatus for operatively connecting a first one of said chargers to said battery, means operated by the next succeeding operation of said apparatus for operatively connecting a second one of said chargers to said battery, and means operative when said battery becomes substantially charged for rendering inoperative any of said chargers which have been operatively connected to said battery.

4. A battery charging system comprising a battery to be charged, apparatus operating at regular time intervals, a plurality of chargers connected to said battery, relay means individual to each of said chargers for controlling the operativeness of said chargers, means controlled by a first operation of said apparatus for operating the relay means individual to the first of said chargers to render its charger operative and for preparing a circuit for operating the relay means individual to the second of said chargers, and means controlled by a second operation of said apparatus for closing said circuit for operating the relay means individual to the second of said chargers to render its charger operative.

5. A battery charging system comprising a battery to be charged, apparatus operating at regular time intervals, a plurality of chargers connected to said battery, relay means individual to each of said chargers for controlling the operativeness of said chargers, means controlled by a first operation of said apparatus for operating the relay means individual to the first of said chargers to render its charger operative and for preparing a circuit for operating the relay means individual to the second of said chargers, means controlled by a second operation of said apparatus for closing said circuit for operating the relay means individual to the second of said chargers to render its charger operative, and means operative when said battery becomes substantially charged for releasing all of said relay means which may have been operated.

6. A battery charging system comprising a battery to be charged, apparatus operating at regular time intervals, a plurality of chargers connected to said battery, relay means individual to each of said chargers for controlling the operativeness of said chargers, means controlled by a first operation of said apparatus for operating the relay means individual to the first of said chargers to render its charger operative and for preparing a circuit for operating the relay means individual to the second of said chargers, and means controlled by a second operation of said apparatus for closing said circuit for operating the relay means individual to the second of said chargers to render its charger operative and for preparing a circuit for operating the relay means individual to another of said chargers whereby said last mentioned circuit may be closed on the next succeeding operation of said apparatus.

7. A battery charging system comprising a battery to be charged, a plurality of chargers associated with said battery, apparatus operating at regular time intervals, means operated by one operation of said apparatus for operatively connecting a first one of said chargers to said battery, means operated by the next succeeding operation of said apparatus for operatively connecting a second one of said chargers to said battery, and a relay connected across said battery and having its constants so adjusted that it will be operated by said battery when said battery becomes substantially charged, said two last mentioned means being capable of being operated only when said relay is released.

8. The method of charging a battery which comprises operatively connecting a charger to said battery, operatively connecting additional chargers successively to said battery at successive definite time intervals, and disconnecting all of the chargers operatively connected to said battery when it becomes substantially charged.

9. The method of charging a battery which comprises operatively connecting chargers to said battery successively at successive definite time intervals and disconnecting from said battery all of the chargers operatively connected thereto when said battery becomes substantially charged.

WALTER FRANKLYN SCOTT.
JAMES STEWART PETERS.